(12) United States Patent
Zolvinski et al.

(10) Patent No.: US 12,117,022 B2
(45) Date of Patent: Oct. 15, 2024

(54) HYDRAULIC OIL DIFFUSER

(71) Applicant: Caterpillar Inc., Peoria, IL (US)

(72) Inventors: Michael A Zolvinski, Bolingbrook, IL (US); Henry Torosyan, Cary, NC (US); Ravishankar Rajendran, Chennai (IN)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 17/225,599

(22) Filed: Apr. 8, 2021

(65) Prior Publication Data

US 2022/0325727 A1 Oct. 13, 2022

(51) Int. Cl.
| | | |
|---|---|---|
| *F15B 1/26* | (2006.01) | |
| *B01D 19/00* | (2006.01) | |
| *E02F 9/08* | (2006.01) | |
| *F15B 21/047* | (2019.01) | |

(52) U.S. Cl.
CPC ............ *F15B 1/26* (2013.01); *B01D 19/0042* (2013.01); *E02F 9/0883* (2013.01); *F15B 21/047* (2013.01)

(58) Field of Classification Search
CPC ...... F15B 1/26; F15B 21/047; B01D 19/0042; E02F 9/0883
See application file for complete search history.

(56) References Cited

U.S. PATENT DOCUMENTS

| | | | | |
|---|---|---|---|---|
| 3,608,272 | A * | 9/1971 | Di Peri et al. | ..... B01D 19/0068 96/175 |
| 6,783,334 | B2 * | 8/2004 | Sanderson | ............ F15B 21/047 417/198 |
| 6,887,376 | B2 | 5/2005 | Cella et al. | |
| 8,991,422 | B2 | 3/2015 | Risatti | |
| 9,011,782 | B2 | 4/2015 | Baig et al. | |
| 10,086,314 | B2 | 10/2018 | Schmidt | |
| 2013/0247552 | A1 * | 9/2013 | Curtis | ..................... F16D 48/02 60/330 |

FOREIGN PATENT DOCUMENTS

| | | | | |
|---|---|---|---|---|
| CN | 202348851 | U * | 7/2012 | .............. F15B 21/04 |
| EP | 2532899 | B1 | 8/2017 | |
| RU | 2606536 | C2 | 1/2017 | |
| WO | 2017082796 | A1 | 5/2017 | |

OTHER PUBLICATIONS

CN202348851U_English (Year: 2011).*
Written Opinion and International Search Report for Int'l. Patent Appln. No. PCT/US2022/022089, mailed Jul. 1, 2022 (14 pgs).

* cited by examiner

*Primary Examiner* — Youngsul Jeong
(74) *Attorney, Agent, or Firm* — Schwegman Lundberg & Woessner, P.A.

(57) ABSTRACT

A diffuser for a return line on a hydraulic tank may include a coupling portion configured for coupling in fluid communication with a return port of the hydraulic tank and for receiving return fluid along an incoming longitudinal direction. The diffuser may also include a dispersion portion in fluid communication with the coupling portion and configured for dispersing the return fluid radially. The diffuser may also include a manifold arranged around the dispersion portion and configured to direct the return fluid circumferentially and axially.

8 Claims, 5 Drawing Sheets

HYDRAULIC OIL DIFFUSER

TECHNICAL FIELD

The present application relates generally to hydraulic systems such as those used on work machines including trucks or other heavy equipment for construction, farm implements, and other machines adapted for performing work. More particularly, the present application relates to a diffuser for a hydraulic oil tank in a hydraulic system. Still more particularly, the present application relates to an axial or other directional flow diffuser for a hydraulic tank.

BACKGROUND

Hydraulic systems often include a holding tank, a pump for receiving relatively low-pressure fluid from the tank and delivering high-pressure fluid to a hydraulic system to perform work. The systems may also include one or more hydraulic cylinders for articulating based on the delivered high-pressure fluid and a valve for controlling the delivery of the high-pressure fluid to the cylinder and, as such, controlling the operation of the cylinder. Hydraulic systems may also fluid delivery lines that provide a pathway for the hydraulic fluid to flow to and from the several components of the hydraulic system. For example, fluid lines may extend from the pump to the control valve and from the control valve to the cylinder. Additional lines may flow from the cylinder back to the control valve and from the control valve back to the tank.

As fluid flows from the hydraulic system back to the tank, the fluid may approach the tank at a relatively high rate of speed. In some cases, a diffuser may be provided to slow the fluid down. The fluid may have a residence time in the tank that allows air in the fluid to escape by rising to the surface of the tank fluid. In some cases, the fluid flow within the tank may provide for insufficient residence times or, for other reasons, the fluid may be captured by the pump and reintroduced into the hydraulic system before air has had a chance to escape from the fluid. In these circumstances, cavitation may occur within the pump or other components of the system, which can damage the components of the hydraulic system and/or cause premature or excessive wear on the components.

U.S. Pat. No. 8,991,422 relates to a return diffuser for a hydraulic tank. The diffuser assembly includes an inlet tube for connection to the inlet to the reservoir. A middle portion of the middle tube is connected to a plurality of diffusers. The diffusers are disposed at an angle with respect to an axis of the inlet tube and the axis of the inlet to the reservoir so that fluid flowing into the reservoir must change flow directions for entering and exiting the diffusers.

SUMMARY

In one or more embodiments, a diffuser for a return line on a hydraulic tank may include a coupling portion configured for coupling in fluid communication with a return port of the hydraulic tank. The coupling portion may also be configured for receiving return fluid along an incoming longitudinal direction. The diffuser may also include a dispersion portion in fluid communication with the coupling portion and configured for dispersing the return fluid radially. The diffuser may also include a manifold arranged around the dispersion portion and configured to direct the return fluid circumferentially and axially.

In one or more embodiments, a hydraulic tank for a hydraulic system may include a housing forming a vessel for containing fluid and a return port on the housing. The return port may be configured for coupling of a hydraulic return line. The hydraulic tank may also include a diffuser arranged within the housing. The diffuser may include a coupling portion configured for coupling in fluid communication with a return port of the hydraulic tank and for receiving return fluid along an incoming longitudinal direction. The diffuser may also include a dispersion portion in fluid communication with the coupling portion. The dispersion portion may be configured for dispersing the return fluid radially. The diffuser may also include a manifold arranged around the dispersion portion and configured to direct the return fluid circumferentially and axially.

In one or more embodiments, a method of installing a diffuser may include securing a diffuser in direct or indirect fluid communication with a return port and within a hydraulic tank. The diffuser may include a coupling portion, a dispersion portion, and a manifold. The manifold be configured to direct incoming fluid axially relative to a longitudinal axis of the diffuser.

DETAILED DESCRIPTION

Figure 1:
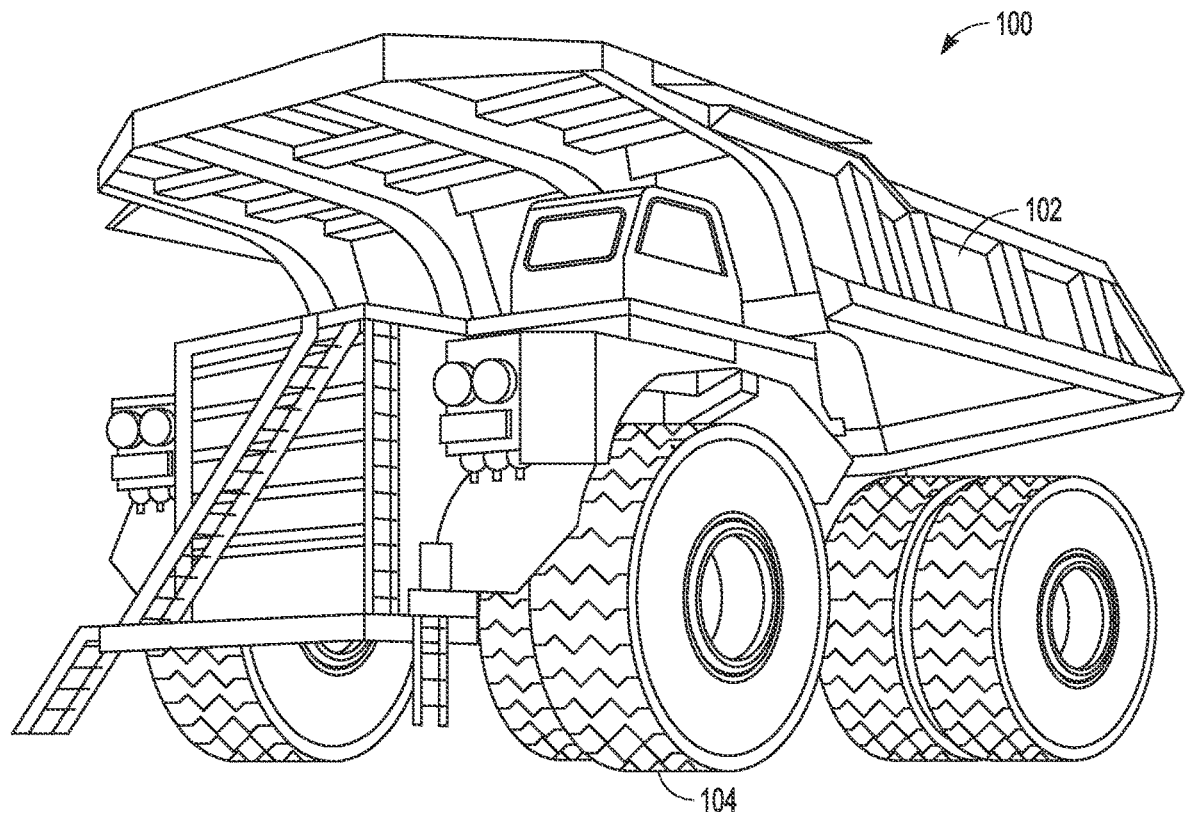
FIG. 1 is a perspective view of a work machine having a hydraulic system for raising and lowering a vessel or truck bed, according to one or more embodiments.

FIG. 1 is a perspective view of a work machine 100. As shown, the work machine 100 may be a mining or haul truck used in open pit mining operations for hauling mined material, for example. The haul truck may include a bed or vessel 102 adapted for receiving mined material or other material, securing or storing the material during transportation from one location to another and for dumping the material. For purposes of dumping the material, the bed or vessel 102 may have a hinged connection to a frame of the work machine 100 at one end and an opposite free end. The bed or vessel 102 may be operable using a hoist such as a hydraulic hoist driven by a hydraulic system 106. The work machine may include a plurality of ground supporting traction elements 104 (e.g., wheels, tracks, skid feet, etc.) for translating the work machine relative to a supporting surface. The traction elements 104 may be coupled to a frame of the work machine 100 with a suspension system. The work machine 100 may include an engine or motor to generate power and to drive the traction system 104, the hoist, and other onboard equipment or systems.

Figure 2:
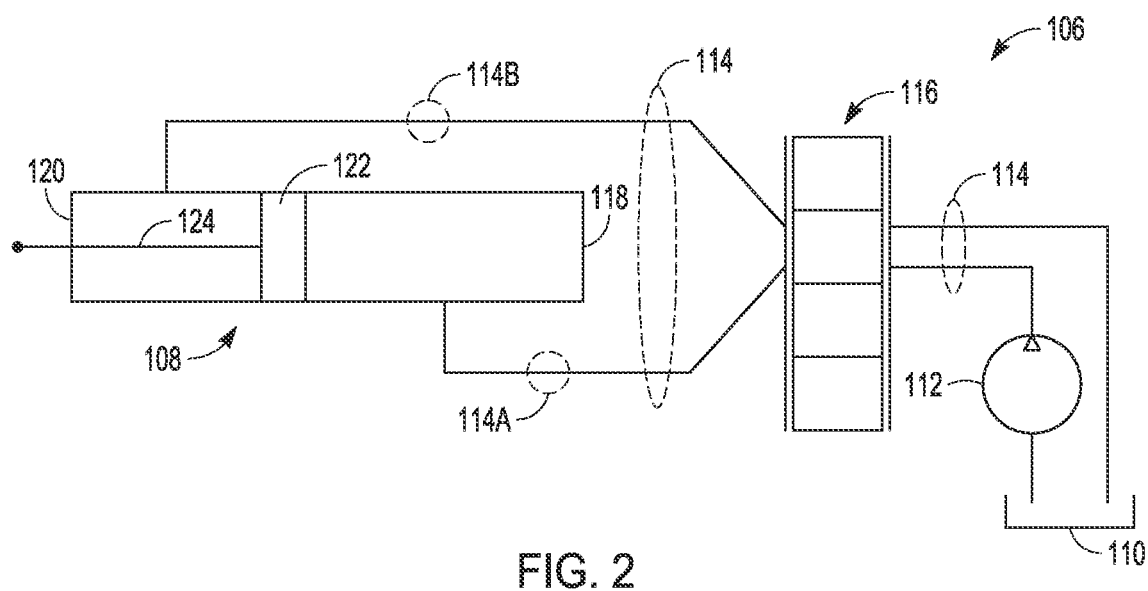
FIG. 2 is a hydraulic schematic of the hydraulic system of the work machine of FIG. 1 and having a tank, according to one or more embodiments.

Referring now to FIG. 2, the hydraulic system 106 of the work machine is shown schematically. The hydraulic system 106 may be configured for controllably pivoting the bed or vessel 102 of the work machine 100 throughout a full range of tilting or pivoting motion between a bottom position where the bed or vessel 102 may rest against one or more stops on the work machine frame 104 and a full tilt position where the hydraulic cylinders 108 of the hydraulic system may be at their fullest available extension. As shown, the hydraulic system 106 may include a tank or reservoir 110, a pump 112, a series of hydraulic lines 114, one or more cylinders 108, and a main valve 116.

Figure 3:
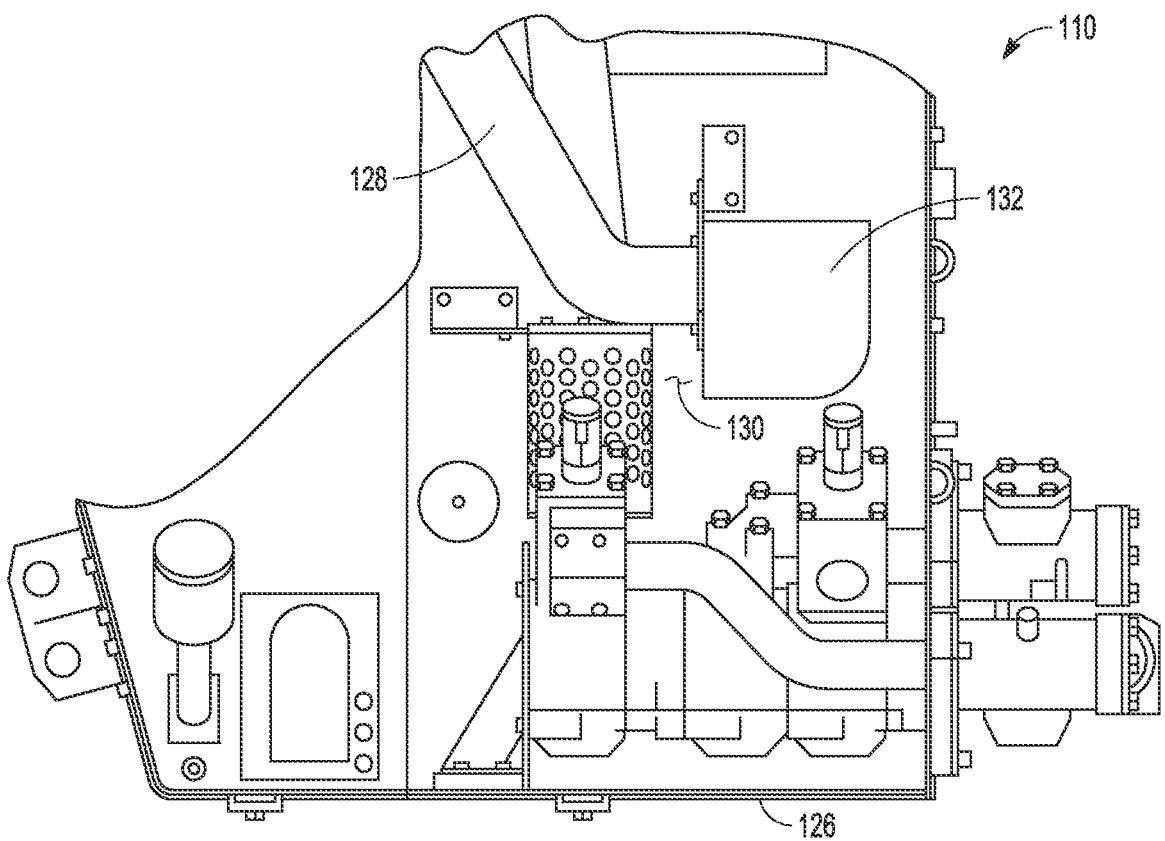
FIG. 3 is an isolated cross-sectional view of the tank of FIG. 2 showing a side view of a diffuser within the tank, according to one or more embodiments.

The hydraulic reservoir 110 may be configured for holding a supply of hydraulic fluid for use by the system and is discussed in more detail with respect to FIG. 3. The hydraulic pump 112 may be arranged in fluid communication with the hydraulic reservoir 110 and may operate to create a pressure below the tank pressure on an intake side and a higher pressure on an output side. As such, the pump may draw fluid from the hydraulic reservoir 110 and deliver it to the operative side of the system. For example, the pump 112 may deliver the fluid to extend one or more hydraulic cylinders 108 when the valve 116 is operated accordingly. The pump may be designed to deliver a selected range of fluid flow suitable for the particular system being provided. In one or more embodiments, the pump 112 may include a load sensing variable displacement pump.

The variable displacement load sensing pump 112 or other pump may be controlled by a signal circuit. When the main valve 112 is opened to provide flow to the load, or cylinders 108 in this system, the signal circuit may be supplied with pressure created by the work being done. The pump 112 may provide sufficient flow for the pump discharge flow to maintain a margin over the load sense pressure unless the pump reaches maximum displacement without achieving this margin pressure. Margin may provide for a system pressure somewhat greater than the load sense signal, for example. In one or more embodiments, maximum raise pressure may be limited by a pressure relief branch (not shown). As such, the pressure relief branch may limit the pressure in the load sense circuit. In one or more embodiments, the pump 112 may also be designed to limit the maximum pump discharge pressure to a pressure below the pressure setting of the pressure relief branch. While a variable displacement load sensing pump has been described, still other pumps may be provided.

The hydraulic lines 114 may extend from the pump to the main valve and from the main valve to the hydraulic cylinders, back to tank, and/or to other aspects of the system. The hydraulic lines 114 may include flexible or rigid pressure resisting lines capable of maintaining the hydraulic fluid at pressures created by the circuit and delivering the hydraulic fluid.

The hydraulic cylinders 108 may be configured for performing work by extending and/or retracting. The hydraulic cylinders 108 may include a housing with a cap end 118 and a rod end 120. The cylinder 108 may include a piston 122 arranged within the housing and configured to articulate through a stroke length within the housing. The cylinder 108 may include a rod 124 coupled to the piston 122 and extending out the rod end 120 of the housing. The housing may include one or more ports for receiving and/or ejecting hydraulic fluid to fill or remove fluid from the housing on one or more sides of the piston causing the piston to articulate back and forth within the housing to extend or retract the piston rod. For example, the hydraulic cylinder 108 may include a port on a cap end of the housing and a port on a rod end of the housing.

With continued reference to FIG. 2, the main valve 116 may be provided for controlling the flow of hydraulic fluid to and from the hydraulic cylinders 108. Generally, the main valve 108 may be in fluid communication with the pump 112 and the hydraulic cylinders 108. In particular, the main valve 116 may be arranged between (e.g., fluidly between such that fluid flow passes through the valve to get to the cylinders) the pump 112 and the hydraulic cylinders 108. A pair of hydraulic lines 114 in the form of a cap end line 114A and a rod end line 114B are provided between the main valve 116 and the hydraulic cylinders 108 where the cap end line 114A extends from the valve 116 and leads to the cap end 118 of the hydraulic cylinders 108 and the rod end line 114B returns from the rod end 120 of the cylinder 108 to the valve 116. While described as "leads" to and "returns" from, each of the cap end line 114A and the rod end line 114B may be bi-directional lines depending on the position of the main valve and the resulting fluid flow directions. While not show in detail, the valve may include a spring centered spool or another type of centering mechanism may be provided. The spool may include one or more valve positions and movement between the one or more valve positions may control the fluid flow through the hydraulic system.

It is to be appreciated that the hydraulic system 106 may be used to operate additional or alternative devices other than hydraulic cylinders 108. For example, hydraulic motors, radiators, accumulators, and/or other hydraulically driven devices may be provided as part of the hydraulic system. In these systems, hydraulic fluid may be drawn from the tank and pumped into the system with a pump and may return to the tank similar to the uses described with the hydraulic cylinders. As such, the tank and, in particular, the diffuser described in more detail below may be provided in conjunction with these types of systems and/or combinations of these systems.

Turning now to FIG. 3, a cross-sectional side view of the tank 110 is shown. As shown, the tank 110 may include a housing with a bottom and a plurality of sidewalls forming a vessel 126 for containing liquid. The vessel 126 may be substantially open to atmospheric pressure, while being closed to contamination and, as such, may have open ports having air filters for allowing the tank to exchange air with the surroundings. The vessel may also include one or more ports for fluidly interacting with the hydraulic system. For example, a return port may be provided on the sidewall of the tank and hydraulic lines 114 may be fluidly coupled to the tank at the return port. The tank 110 may also include an inwardly extending delivery conduit 128 that extends from the return port on the outside of the tank to a fluid delivery location 130 within the tank 110. The delivery conduit 128 may carry the returning hydraulic fluid from the wall of the tank 110 to the delivery location 130. As shown, a diffuser 132 may be arranged on the end of the delivery conduit 128. As also shown, multiple return ports and delivery conduits may be provided depending on the needs of the hydraulic system. Moreover, the delivery conduits 128 may be configured to deliver the returning fluid to a location within the tank that avoids other internal equipment within the tank and helps to increase the residence time of the fluid. As another example of a port on the tank, a supply port may be provided on the sidewall of the tank and hydraulic lines 114 or a pump may be coupled to the tank 110 at the supply port. The pump 112 may draw fluid from the tank by creating a pressure below atmospheric pressure at or near the supply port such that tank fluid is forced through the supply port by the higher atmospheric pressure and the pump may then deliver fluid to the hydraulic system.

Figure 4C:
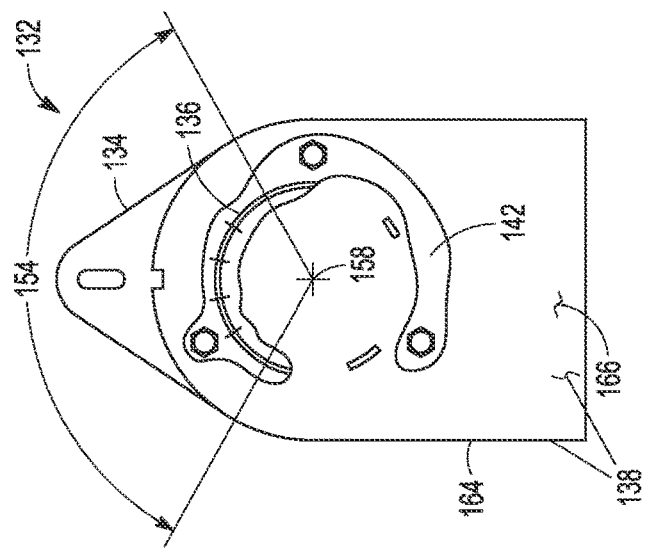
FIG. 4C is a free end view of the diffuser of FIG. 3, according to one or more embodiments.
Figure 4B:
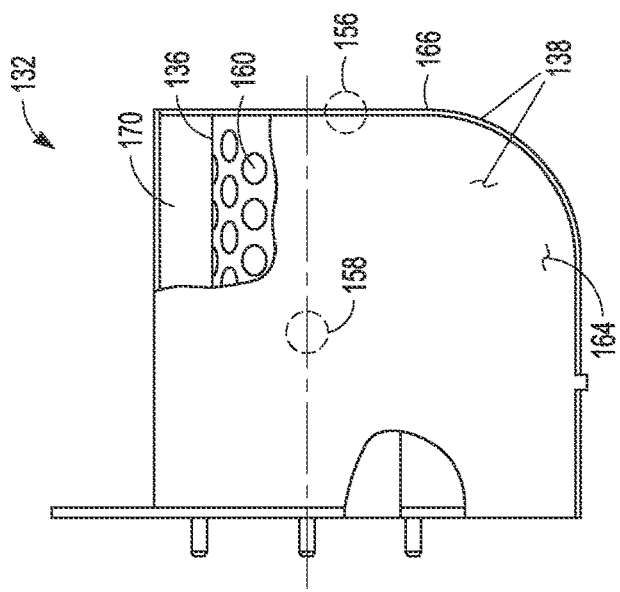
FIG. 4B is a side, partial break away, view of the diffuser of FIG. 3, according to one or more embodiments.
Figure 4A:
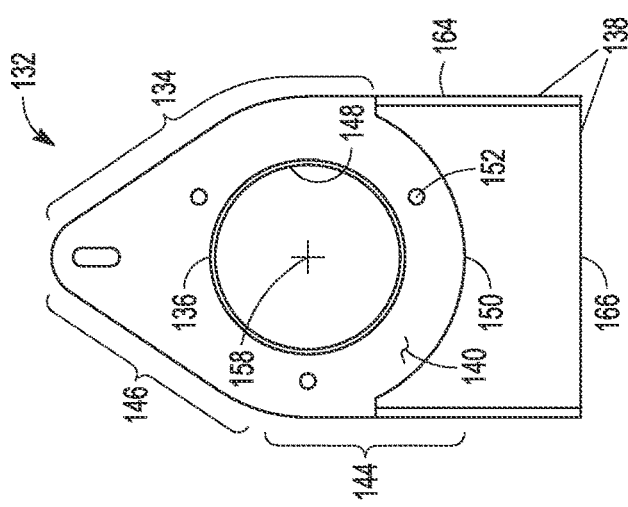
FIG. 4A is a connection end view of the diffuser of FIG. 3, according to one or more embodiments.

Turning now to FIGS. 4A-4C, detailed views of the diffuser 132 are shown. The diffuser 132 may be configured to slow the velocity of the returning hydraulic fluid and to direct the fluid in a manner that increases the fluid's residence time within the tank 110. The increased residence time may allow for air within the fluid to escape before the fluid reenters the hydraulic system. In one or more embodiments, the diffuser 132 may include a coupling portion 134, a dispersion portion 136, and a manifold portion 138.

As shown in FIG. 4A, the coupling portion 134 may be configured to couple the diffuser 132 to the delivery conduit 128 and receive the fluid from the delivery conduit 128. As shown, the coupling portion 134 may be in the form of a flange-like coupling plate adapted for engaging a flange of the delivery conduit 128 to form a seal. The coupling plate may include a mating surface 140 for abutting a flange of the delivery conduit 128, or for abutting a gasket therebetween, and an opposite internal surface 142 (see FIG. 4C) for containing hydraulic fluid. The coupling plate may include an annular portion 144 and an ear portion 146. The annular portion 144 of the coupling plate may include a circular inner edge 148 defining a bore diameter that may be the same or similar to an inner diameter of the delivery conduit 128. The annular portion 144 may include a circular outer edge 150 defining a flange diameter that may be the same or similar to an outer diameter of a flange on the delivery conduit 128. The annular portion 144 may include threaded studs 152 or other fasteners extending substantially orthogonally from the mating surface 140 and spaced to align with holes in a flange of the delivery conduit 128. As such, installation of the diffuser 132 may include aligning the studs 152 with the holes in the flange of the delivery conduit 128, insertion of the studs 152 through the holes, and securing the studs 152 with nuts and washers, for example. The ear portion 146 may extend from the annular portion 144 at tangential lines extending from the outer diameter of the annular portion 144. As shown in FIG. 4C, the intersections of the tangential lines extending away from the annular portion 144 may define an included angle 154 ranging from approximately 90 degrees to approximately 130 degrees or approximately 102 degrees to approximately 122 degrees, or an included angle of approximately 112 degrees may be provided. The ear portion 146 may extend away from the annular portion 144 to form an attachment tab for securing the diffuser 132 to a tank wall, for example.

The dispersion portion 136 may be configured for dispersing the fluid as it enters the diffuser 132 and is slowed. For example, in conjunction with an end plate 156 on the manifold 138, the dispersion portion 136 may direct the fluid radially outward and/or upward relative to the incoming flow stream and/or the longitudinal axis 158 of the diffuser 132. As shown, partially in FIGS. 4B and 4C and again in FIGS. 5A and 5B, the dispersion portion 132 may include a substantially tubular portion extending along a longitudinal axis 158 of the diffuser 132 and away from the internal surface 142 of the coupling portion 134. In one or more embodiments, the tubular portion may be a cylindrical portion having an inner diameter that is substantially the same as the inner diameter of the delivery conduit 128 and/or the diameter of the inner edge 148 of the annular portion 144 of the coupling plate. The cylindrical portion may include a cylindrical wall having dispersing perforations, orifices, or holes 160 that allow the fluid to flow through the cylindrical wall. For purpose of directional control, the holes may be arranged on particular portions of the cylindrical wall. As shown, the holes may be arranged on an upper side of the cylindrical wall and may extend along generally the full length of the cylindrical portion and around the surface of the cylindrical wall through a selected included angle. As referenced in FIG. 5B, the selected included angle 162 may range from approximately 60 degrees to approximately 225 degrees, approximately 90 degrees to approximately 200 degrees, approximately 150 degrees to approximately 180 degrees, or approximately 160 to approximately 170. The holes 160 may include square, triangular, circular, or other opening shapes and may be arranged in a pattern providing for an approximately 50% open and 50% closed surface in the area of the openings, while the remaining portion of the cylindrical wall may be substantially 100% closed. The cylindrical portion may be secured to the inner surface of the coupling portion 134 or coupling plate and may be aligned with the inner edge 148 of the annular portion thereof. The cylindrical portion may be welded or otherwise secured to the inner surface 142 of the coupling portion or plate 134.

The manifold 138 may be configured to direct the radially dispersed fluid circumferentially around the cylindrical portion and axially along the cylindrical portion. In one or more embodiments, axially directed fluid may be directed in a direction opposite the incoming flow direction defined by the delivery conduit 128. As shown, the manifold 138 may include a surrounding cover 164 and a diverter portion 166. The surrounding cover 164 may be adapted to direct the fluid around the cylindrical portion. As shown, the surrounding cover may include a u-shaped plate, when viewed in cross-section as in FIGS. 4C and 5B. The curved portion 172 of the u-shaped plate may have a radius of curvature 168 with a center arranged at the longitudinal axis of the cylindrical portion. The radius 168 may be larger than the radius of the outer surface of the cylindrical wall defining a concentric partial annular chamber 170 around the cylindrical portion. The u-shaped plate, again when viewed in cross-section, may have substantially straight sidewall legs 174 extending downward beyond the bottom of the cylindrical portion defining sides of an outlet channel 176 below the cylindrical portion. The u-shaped plate may have a length measured along the longitudinal axis of the diffuser 132 that is the same or similar to the length of the dispersing portion 136. The diverter portion 166 may be adapted to stop the longitudinal flow of fluid within the dispersing portion and direct the fluid axially as it receives the fluid exiting the annular chamber created by the cover 164. The diverter portion 166 may include an L-shaped plate arranged on an end and bottom of the diffuser 132. The upper leg 178 of the L-shaped plate may be arranged on an end of the dispersing portion 136 and on an end of the cover 164 to close off fluid flow out the end of the diffuser 132. This portion of the diverter may be considered an end plate 156 and may be the portion of the diffuser 132 that arrests longitudinal flow of the incoming fluid. The upper leg 178 may include a radiused top edge 180 as shown in FIG. 4C, for example, that follows and aligns with the end of the u-shaped plate of the cover 164. The seam between these two elements may be welded or otherwise secured. The bottom leg 182 of the L-shaped plate may be substantially rectangular and may be arranged to extend between the bottom ends of the u-shaped cover plate and forming a bottom of the diffuser 132. The seam between these two elements may be welded or otherwise secured. The upper leg 178 and bottom leg 182 of the diverter may transition with a curved heel 184. The heel may include a radius substantially similar to the outer radius of the cover 164 and may function to provide a thrust curve in the bottom end of the diffuser 132. This thrust curve may direct the fluid being received by the diverter 166 from the annular chamber 170 in an axial flow direction.

In the present example, the location of the thrust curve in the bottom end of the diffuser 132 may create an axial flow direction that extends longitudinally along the diffuser 132 and in a direction opposite the incoming flow from the delivery conduit 128. However, the thrust curve may be arranged at a front bottom end instead, which may create a fluid flow parallel to and in the same direction as the incoming fluid from the delivery conduit 128. Still further, the thrust curve may be a part of the bottom end of the U-shaped cover 164 and the bottom portion of the opposing leg of the cover may be omitted allowing fluid flow to flow axially, but lateral to the incoming flow direction. Still further, a splitting-type thrust curve system may be provided at a midway point along the diffuser where multiple and opposing thrust curves are provided to direct fluid in opposite directions and flow channels may be provided out each end of the diffuser. Still further, while a single coupling portion 134 has been shown to deliver fluid to the diffuser from one end, multiple coupling portions 134 may be provided. For example, an additional delivery conduit may deliver fluid to the end of the diffuser opposite the coupling portion 134 shown and may be secured to the diffuser at an additional coupling portion, which may be positioned in place of the end plate 156. In this embodiment, an internal baffle or other flow stopping or slowing mechanism may be provided at a mid-length along the cylindrical portion, for example. In other embodiments, the opposing incoming flow may be sufficient to slow the flows and divert them through the cylindrical portion.

It is also to be appreciated that the term longitudinal in the present application has been used to describe fluid flows, directions, and axes that extend along the length of the diffuser as opposed to, for example, across the diffuser or laterally. As such, while the present diffuser is arranged with its longitudinal axis in a horizontal orientation (e.g., parallel to the bottom of the tank), the diffuser may be arranged with its longitudinal axis arranged horizontally, tilted, tipped, angled, vertical, or a combination of these orientations and nothing in the present application should be construed to require a horizontal orientation.

While a work machine 100 in the form of a mining or haul truck has been shown, work machines of all types may utilize the presently described hydraulic system with the described diffuser. For example, wheel loaders, skid steers, farm equipment, trench digging equipment, and still other machines that perform work may include a hydraulic system as described herein.

INDUSTRIAL APPLICABILITY

In operation and use, the present hydraulic system may provide for directing the fluid flow as it exits the diffuser 132 to provide for longer residence times of the hydraulic fluid and/or more directional control of the incoming return fluid to increase the fluid's ability to separate from air entrained therein. In one or more embodiments, the present diffuser design may allow for use of smaller hydraulic tanks by controlling the incoming direction of fluid flow. For example, directing the fluid flow away from a supply port where the fluid may more quickly get drawn into the pump may allow for smaller tank designs because of the directional control of the fluid. In one or more embodiments, this may allow for a reduction in the amount of oil used in a hydraulic system, which may reduce maintenance costs associated with oil changes and the like.

Figure 5B:
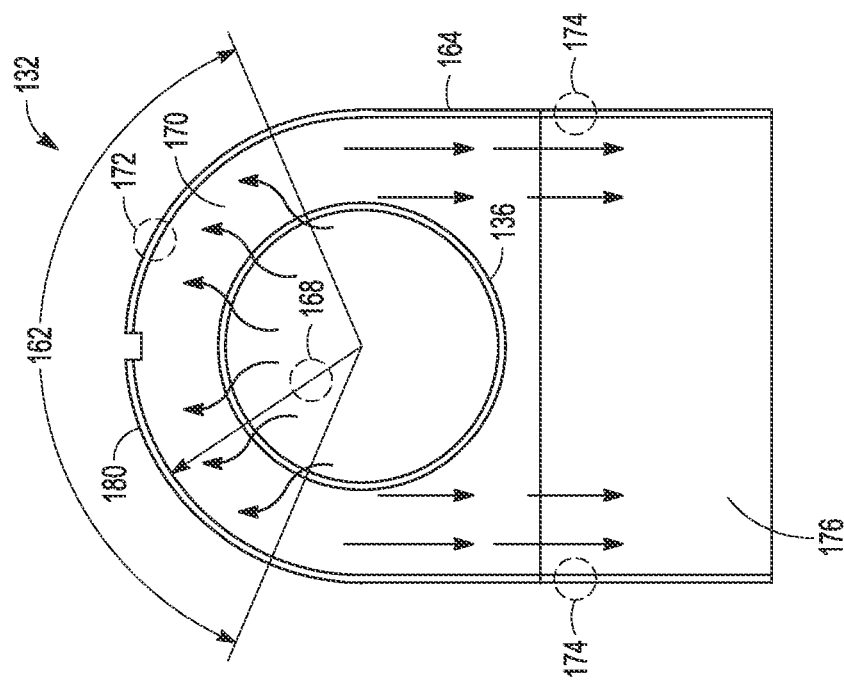
FIG. 5B is a transverse cross-sectional view of the diffuser of FIG. 3 and depicting flow directions, according to one or more embodiments.
Figure 5A:
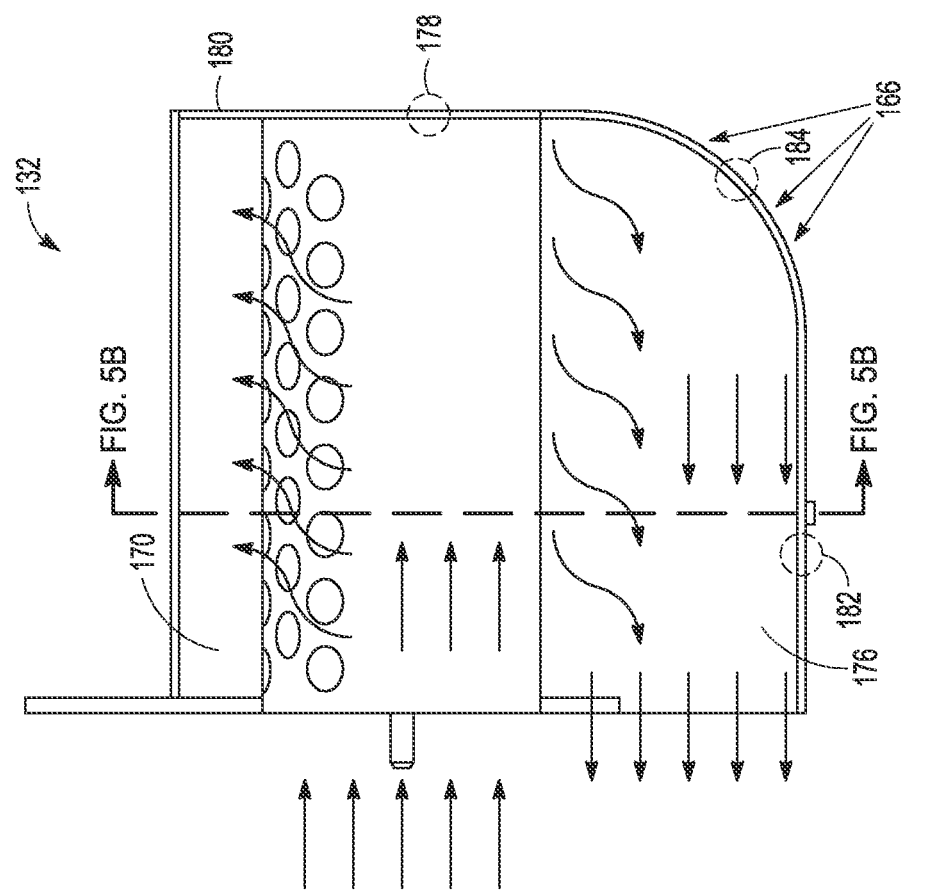
FIG. 5A is a longitudinal cross-sectional view of the diffuser of FIG. 3 and depicting flow directions, according to one or more embodiments.
Figure 6:
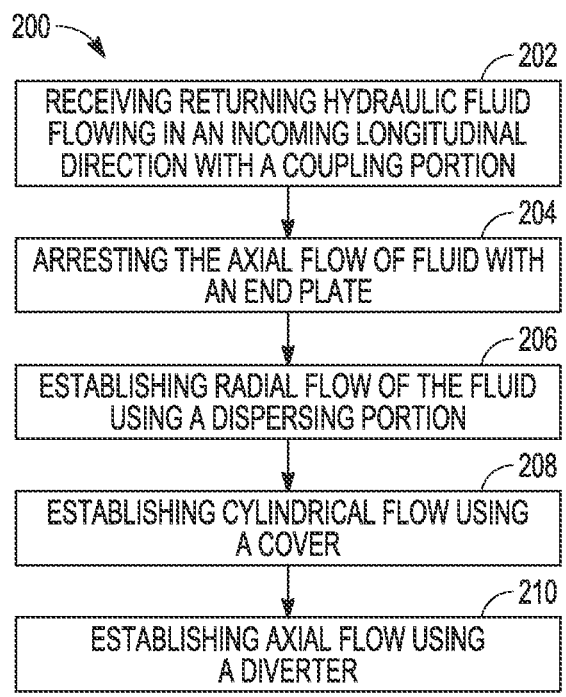
FIG. 6 is a diagram depicting a method of operation of the diffuser, according to one or more embodiments.

In one or more embodiments, a method of operation 200 may be provided as depicted in FIG. 6 and as modeled in FIGS. 5A and 5B. The method may include receiving returning hydraulic fluid flowing in an incoming longitudinal direction with a coupling portion (202). The method may also include arresting the axial flow of fluid with an end plate (204) and establishing radial flow of the fluid using a dispersing portion (206). In one or more embodiments, the radial flow may include an upward radial flow. The method may also include establishing cylindrical flow using a cover (208) and establishing axial flow using a diverter (210). In one or more embodiments, the axial flow may be in a direction generally parallel to and opposite the incoming longitudinal direction.

Figure 7:
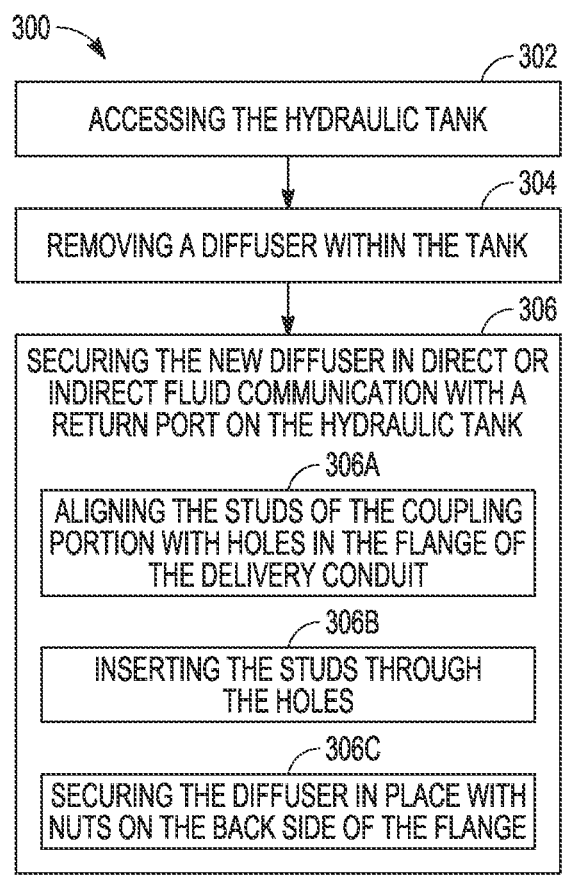
FIG. 7 is a diagram depicting a method of installation of the diffuser of FIG. 3, according to one or more embodiments.

In one or more embodiments, a method of installation 300 may be provided as depicted in FIG. 7. The method may include accessing the hydraulic tank (302) and removing by unbolting or otherwise removing a diffuser within the tank (304). The method may also include securing the new diffuser in direct or indirect fluid communication with a return port on the hydraulic tank (306). Installing the new diffuser may include aligning the studs of the coupling portion with holes in the flange of the delivery conduit (306A). Installing may also include inserting the studs through the holes (306B) and securing the diffuser in place with nuts on the back side of the flange (306C). In one or more embodiments, the diffuser may include a coupling portion, a dispersing portion and a manifold portion as described above. As such, the new diffuser may provide for establishing radial flow, followed by circumferential flow, and finally further axial flow. In one or more embodiments, the new diffuser may establish axial flow in a direction opposite that of the incoming longitudinal flow.

The above detailed description is intended to be illustrative, and not restrictive. The scope of the disclosure should, therefore, be determined with references to the appended claims, along with the full scope of equivalents to which such claims are entitled.

What is claimed is:

1. A diffuser for a return line on a hydraulic tank, the diffuser comprising:
    a coupling portion configured for coupling in fluid communication with a return port of the hydraulic tank and for receiving return fluid at a first flow rate and along an incoming longitudinal and horizontal direction;
    a dispersion portion comprising a cylindrical portion defining a longitudinal axis parallel to the longitudinal and horizontal direction, the dispersion portion being in fluid communication with the coupling portion and configured for dispersing the return fluid radially upward relative to the longitudinal and horizontal direction and for slowing the return fluid; and
    a manifold comprising:
        a u-shaped cover plate arranged about and extending along the longitudinal axis and defining a chamber around the cylindrical portion; and
        an L-shaped diverter portion having an upper leg and a bottom leg, the upper leg being arranged on respective ends of each of the u-shaped cover plate and the cylindrical portion and the bottom leg forming a bottom of the diffuser, the manifold being configured to direct the return fluid circumferentially about the longitudinal and horizontal direction, downward relative to the longitudinal and horizontal direction, and, axially, and out of the diffuser at a second flow rate slower than the first flow rate.

2. The diffuser of claim 1, wherein the coupling portion comprises a coupling plate configured for securing to a flange of a delivery conduit within the hydraulic tank.

3. The diffuser of claim 1, wherein the cylindrical portion comprises a cylindrical wall arranged such that the longitudinal axis is substantially parallel with a bottom of the hydraulic tank and having a bottom and a top.

4. The diffuser of claim 3, wherein the cylindrical wall comprises perforations on the top.

5. The diffuser of claim 1, wherein the chamber is an annular chamber around the dispersion portion.

6. The diffuser of claim 1, wherein the L-shaped diverter portion comprises a heel in the form of a thrust block for directing the fluid axially along the diffuser.

7. The diffuser of claim 6, wherein the thrust block is arranged to direct the fluid axially in a direction parallel to and opposite the incoming longitudinal and horizontal direction.

8. A method of installing a diffuser, the method comprising:

securing a diffuser using a coupling plate, in direct or indirect fluid communication with a return port, and within a hydraulic tank wherein the diffuser comprises a coupling portion including the coupling plate, a dispersion portion comprising a cylindrical portion defining a longitudinal axis, and a manifold, the manifold configured to direct incoming fluid axially relative to a longitudinal axis of the diffuser and comprising:

a u-shaped cover plate arranged about and extending along the longitudinal axis; and an L-shaped diverter portion having an upper leg arranged on respective ends of the u-shaped cover plate and the cylindrical portion and a bottom leg forming a bottom of the diffuser.

* * * * *